(12) United States Patent
Konishi et al.

(10) Patent No.: US 8,652,252 B2
(45) Date of Patent: Feb. 18, 2014

(54) EXTRUSION MOLDING HYDRAULIC COMPOSITION

(71) Applicant: Shin-Etsu Chemical Co., Ltd., Tokyo (JP)

(72) Inventors: Hidekazu Konishi, Joetsu (JP); Rumiko Itoh, Joetsu (JP); Tsutomu Yamakawa, Joetsu (JP); Kazuhisa Hayakawa, Joetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 13/933,782

(22) Filed: Jul. 2, 2013

(65) Prior Publication Data

US 2014/0018477 A1    Jan. 16, 2014

(30) Foreign Application Priority Data

Jul. 10, 2012 (JP) ................. 2012-154270

(51) Int. Cl.
*C04B 24/10* (2006.01)
*C04B 14/38* (2006.01)
*C04B 16/02* (2006.01)

(52) U.S. Cl.
USPC ............... 106/805; 106/172.1; 106/197.01; 106/711; 106/730; 536/95; 536/96

(58) Field of Classification Search
USPC ............ 106/172.1, 204.01, 711, 730, 805; 536/95, 96
See application file for complete search history.

(56) References Cited

U.S. PATENT DOCUMENTS

| | | | | |
|---|---|---|---|---|
| 3,388,082 A | * | 6/1968 | Rodgers et al. | 524/43 |
| 3,709,876 A | * | 1/1973 | Glomski et al. | 536/91 |
| 4,458,068 A | * | 7/1984 | Warner et al. | 536/91 |
| 4,470,463 A | * | 9/1984 | Holland | 166/293 |
| 4,478,640 A | * | 10/1984 | Holland | 106/607 |
| 4,588,772 A | * | 5/1986 | Bohmer et al. | 525/54.23 |
| 4,707,188 A | * | 11/1987 | Tsuda et al. | 106/639 |
| 4,939,192 A | * | 7/1990 | t'Sas | 524/44 |
| 6,902,797 B2 | * | 6/2005 | Pollock et al. | 428/304.4 |
| 6,955,844 B2 | * | 10/2005 | Tagge et al. | 428/53 |
| 7,588,635 B2 | * | 9/2009 | Yamakawa et al. | 106/805 |
| 8,282,732 B2 | * | 10/2012 | Xenopoulos et al. | 106/805 |
| 2005/0139130 A1 | * | 6/2005 | Partain, III et al. | 106/730 |
| 2011/0077391 A1 | * | 3/2011 | Hayakawa et al. | 536/91 |
| 2011/0262689 A1 | * | 10/2011 | Bayer | 428/116 |
| 2011/0262690 A1 | * | 10/2011 | Bayer | 428/116 |
| 2012/0302426 A1 | * | 11/2012 | DeRosa et al. | 501/153 |
| 2013/0193370 A1 | * | 8/2013 | Adden et al. | 252/73 |

FOREIGN PATENT DOCUMENTS

| | | | | |
|---|---|---|---|---|
| JP | 5-85799 A | 4/1993 | | |
| JP | 8-183647 A | 7/1996 | | |
| JP | 9-249438 A | 9/1997 | | |
| JP | 2002-20147 A | 1/2002 | | |
| WO | WO 2004/065319 A2 | * | 8/2004 | C04B 24/38 |

OTHER PUBLICATIONS

Derwent-Acc-No. 1986-144394, abstract of Australian Patent Specification No. AU 8545169 A (Apr. 1986).*
Derwent-Acc-No. 2009-A20919, abstract of Korean Patent Specification No. KR 824116 B1 (Apr. 2008).*
Akira Isogai et al., "Distribution of Substituents in Cellulose Ethers Prepared in Aqueous and Non-Aqueous Systems", Sen-I Gakkaishi, 1984, pp. T-504-T-511, vol. 40, No. 12.
Yasuyuki Tezuka et al., "Determination of Substituent Distribution in Cellulose Ethers by Means of a 13C NMR Study on Their Acetylated Derivatives. 1. Methylcellulose", Macromolecules, 1987, pp. 2413-2418, vol. 20, No. 10.

* cited by examiner

*Primary Examiner* — Anthony J Green
(74) *Attorney, Agent, or Firm* — Birch, Stewart, Kolasch & Birch, LLP

(57) ABSTRACT

A hydraulic composition comprising a water-soluble hydroxyalkyl alkyl cellulose, cement, aggregate, reinforcing fibers, and water is provided. The hydroxyalkyl alkyl cellulose has a degree of alkyl substitution of 1.2-1.7, the sum of the degree of alkyl substitution and the molar substitution of hydroxyalkyl is 1.5-2.0, and a proportion of glucose ring not substituted with alkyl and hydroxyalkyl groups per glucose ring unit is up to 10 mol %. The composition cures within a short time and is extrusion moldable even at elevated temperature.

4 Claims, No Drawings

EXTRUSION MOLDING HYDRAULIC COMPOSITION

CROSS-REFERENCE TO RELATED APPLICATION

This non-provisional application claims priority under 35 U.S.C. §119(a) on Patent Application No. 2012-154270 filed in Japan on Jul. 10, 2012, the entire contents of which are hereby incorporated by reference.

TECHNICAL FIELD

This invention relates to a hydraulic composition, typically extrusion molding hydraulic composition.

BACKGROUND ART

In the past, extrusion molding compositions used asbestos and water-soluble cellulose ether as molding additives for enabling effective molding of parts having surface smoothness and strength. The late legal regulations ban asbestos. Often pulp fibers are used as the replacement of asbestos. Since pulp fibers are less dispersible, it is a common practice to use water-soluble cellulose ether in more amounts than before for the purpose of improving dispersion and strength or facilitating extrusion molding.

While water-soluble cellulose ether serves as a binder, it has the drawback that at a temperature in excess of 40° C., it undergoes thermal gelation, loses the binder function, and causes cracks and meandering stream during molding. Namely, compositions are difficult to mold at high temperature.

Under the circumstances, Patent Document 1 discloses an asbestos-free extrusion molding composition comprising cement and a water-soluble cellulose ether. Thermal gelation is prevented by restricting the degree of methoxy substitution to a range of 1.0 to 2.5 and the molar substitution of hydroxyalkyl to a range of 0.25 to 2.5. This is effective particularly when the hydroxyalkyl group is hydroxyethyl.

Patent Document 2 describes hydroxypropyl methyl cellulose in which a ratio of the degree of methoxy substitution to the molar substitution of hydroxypropyl is from 4.5 to 6.0, and specifically extrusion molding using hydroxypropyl methyl cellulose having a degree of methoxy substitution of up to 1.5.

Since water-soluble cellulose ether also serves as a setting retarder for cement, a problem arises when it is added to a cement-based extrusion molding composition. A long cure time is necessary when the molded part is allowed to stand and cure until the cement-based composition is set.

Solutions to this problem are known. Intending to shorten the cure time, Patent Document 3 proposes a cement-based extrusion molding composition to which a mixture of water-soluble cellulose ether and a setting accelerator such as calcium chloride is added.

Patent Document 4 discloses combined use of water-soluble cellulose ether and polyisoprene sulfonic acid compound. Satisfactory plasticity is available even when the amount of water-soluble cellulose ether added is reduced as compared with the water-soluble cellulose ether used alone.

Although Patent Documents 1 and 2 indicate improvements in thermal gelation temperature, they refer nowhere to the setting retardation effect of water-soluble cellulose ether. Although Patent Document 3 is successful in shortening the cure time through the combined use of a setting accelerator such as calcium chloride, the combined use undesirably reduces the thermal gelation temperature of water-soluble cellulose ether.

When added to extrusion molding compositions, water-soluble cellulose ether must meet both the functions of plasticity and water retention. If the amount of water-soluble cellulose ether added is reduced as in Patent Document 4, extrusion molding becomes difficult.

CITATION LIST

Patent Document 1: JP-A H05-085799
Patent Document 2: JP-A H08-183647
Patent Document 3: JP-A H09-249438
Patent Document 4: JP-A 2002-020147

DISCLOSURE OF INVENTION

An object of the invention is to provide an extrusion molding hydraulic composition which is successful in shortening the cure time because of low set retardation to cement, and effectively extrusion moldable because of inhibited thermal gelation even at elevated temperature.

The inventors have found that a water-soluble hydroxyalkyl alkyl cellulose having a specific chemical structure, more specifically a certain ash content and light transmittance is significantly effective in overcoming the outstanding problems.

In one aspect, the invention provides an extrusion molding hydraulic composition comprising a water-soluble hydroxyalkyl alkyl cellulose, cement, an aggregate, reinforcing fibers, and water. The hydroxyalkyl alkyl cellulose has a degree of alkyl substitution of 1.2 to 1.7, the sum of the degree of alkyl substitution and the molar substitution of hydroxyalkyl is 1.5 to 2.0, and a proportion of glucose ring not substituted with alkyl and hydroxyalkyl groups per glucose ring unit is up to 10 mol %.

In a preferred embodiment, the hydroxyalkyl alkyl cellulose is hydroxypropyl methyl cellulose or hydroxyethyl methyl cellulose. More preferably, the hydroxyalkyl alkyl cellulose has an ash content which is up to 1.0% by weight for hydroxypropyl methyl cellulose or up to 2.0% by weight for hydroxyethyl methyl cellulose.

Also preferably, the hydroxyalkyl alkyl cellulose has a light transmittance of at least 75% when measured as a 2 wt % aqueous solution at 20° C., wavelength 720 nm, and cell length 20 mm.

Advantageous Effects of Invention

The extrusion molding hydraulic composition of the invention is successful in shortening the cure time and effectively extrusion moldable even at elevated temperature.

DESCRIPTION OF PREFERRED EMBODIMENTS

As used in the art, DS refers to "degree of substitution" and MS to "molar substitution".

The invention pertains to an extrusion molding hydraulic composition comprising a water-soluble hydroxyalkyl alkyl cellulose, cement, an aggregate, reinforcing fibers, and water.

The hydroxyalkyl alkyl cellulose used herein should have a degree of alkyl substitution of 1.2 to 1.7, preferably 1.3 to 1.6, and more preferably 1.4 to 1.5. The sum of the degree of alkyl substitution and the molar substitution of hydroxyalkyl is 1.5 to 2.0, preferably 1.6 to 1.9, and more preferably 1.7 to 1.8. If the DS of alkyl is less than 1.2 and the sum of DS of alkyl and MS of hydroxyalkyl is less than 1.5, then the cure time is prolonged. If the DS of alkyl exceeds 1.7 and the sum of DS of alkyl and MS of hydroxyalkyl exceeds 2.0, then thermal gelation occurs at relatively low temperature, failing in satisfactory extrusion molding.

With respect to DS of alkyl and MS of hydroxyalkyl, measurement may be made by the assay of hypromellose (hydroxypropyl methyl cellulose) prescribed in the Japanese Pharmacopoeia, 16th Edition.

A proportion of glucose ring not substituted with alkyl and hydroxyalkyl groups per glucose ring unit is up to 10 mol %, preferably up to 9 mol %, and more preferably up to 8 mol %. If this proportion exceeds 10 mol %, then a long cure time must be taken.

A proportion of glucose ring not substituted with alkyl and hydroxyalkyl groups per glucose ring unit is analyzed as described in Macromolecules, 20, 2413 (1987) and Sen-i Gakkaishi (Journal of Japanese Textile Society), 40, T-504 (1984), by subjecting a water-soluble hydroxyalkyl alkyl cellulose to hydrolysis in sulfuric acid, neutralization, chemical reduction with sodium borohydride, purification by filtration, and acetylation. The sample is analyzed by mass spectrometry together with one of $^{13}$C-NMR, liquid chromatography and gas chromatography, while heating from 150° C. to 280° C. at a rate of 2.5° C./min and holding at 280° C. for 10 minutes. The proportion is determined from detection graphical parameters of respective groups thus identified.

The water-soluble hydroxyalkyl alkyl cellulose used herein is a nonionic cellulose ether. Examples include hydroxypropyl methyl cellulose and hydroxyethyl methyl cellulose.

The water-soluble hydroxyalkyl alkyl cellulose may be prepared by reaction of cellulose with sodium hydroxide to form alkaline cellulose and subsequent reaction with an etherifying agent. Since a large amount of inorganic salts is generated as by-product, the product is purified by washing with hot water.

The residual inorganic salts are acknowledgeable as ash content. The measurement of an ash content is described in the Japanese Pharmacopoeia. A water-soluble hydroxyalkyl alkyl cellulose sample is carbonized by heating it by a heater while adding conc. sulfuric acid thereto. The sample is heated and held at a temperature of 550 to 650° C. until a constant weight is reached, then allowed to cool down, after which the weight of the sample is measured.

The hydroxyalkyl alkyl cellulose should preferably have an ash content which is up to 1.0% by weight, more preferably up to 0.5% by weight in the case of hydroxypropyl methyl cellulose or which is up to 2.0% by weight, more preferably up to 1.5% by weight in the case of hydroxyethyl methyl cellulose. If the ash content of hydroxypropyl methyl cellulose exceeds 1.0 wt % or if the ash content of hydroxyethyl methyl cellulose exceeds 2.0 wt %, then thermal gelation may occur at relatively low temperature, failing in satisfactory extrusion molding.

In addition, the hydroxyalkyl alkyl cellulose should preferably have a light transmittance of at least 75%, more preferably at least 80% when measured as a 2 wt % aqueous solution at 20° C., wavelength 720 nm, and cell length 20 mm. If the light transmittance of cellulose is less than 75%, the cellulose may contain a less fraction serving as binder, failing in satisfactory extrusion molding. Provided that the light transmittance of deionized water as measured by a photoelectric colorimeter Model PC-50 is 100%, the "light transmittance" refers to the light transmittance of a 2 wt % aqueous solution of hydroxyalkyl alkyl cellulose measured under the same conditions. It is an index indicative of a fraction of hydroxyalkyl alkyl cellulose dissolved in water. For example, a high light transmittance indicates a more water-soluble fraction.

The hydroxyalkyl alkyl cellulose should preferably have a viscosity at 20° C. of 1,000 to 50,000 mPa·s, more preferably 1,500 to 50,000 mPa·s, and even more preferably 3,000 to 50,000 mPa·s, when measured as a 1 wt % aqueous solution by a Brookfield viscometer at 12 rpm.

To the extrusion molding hydraulic composition, the hydroxyalkyl alkyl cellulose is preferably added in an amount of 0.3 to 2.0% by weight, more preferably 0.5 to 1.5% by weight based on the entire components in the composition excluding water. A composition containing less than 0.3 wt % of the cellulose may be poor in water retention and deformation and difficult to extrusion mold. A composition containing more than 2.0 wt % of the cellulose may have too high a viscosity, be difficult to mold and tend to stick to the die, resulting in molded parts with splits.

As defined above, the extrusion molding hydraulic composition contains cement (or hydraulic substance), an aggregate, reinforcing fibers, and water as well as the water-soluble hydroxyalkyl alkyl cellulose.

Suitable cements include ordinary Portland cement, high-early-strength Portland cement, Portland blast furnace slag cement, moderate heat Portland cement, fly-ash cement, alumina cement, and silica cement. A portion of the cement may be replaced by gypsum such as gypsum dihydrate, gypsum hemihydrate or anhydrous gypsum. An appropriate amount of cement used is 20 to 60% by weight based on the entire components in the composition excluding water.

Suitable aggregates include powdered silica and fly ash. Besides, lightweight aggregates are used when weight reduction is desired, and include perlite, hollow microspheres of organic or inorganic material, and styrene beads. Whether the aggregate is ordinary or lightweight, it is combined with the hydraulic substance so that the desired properties are achievable. The cement (and optional gypsum) and the aggregate may be used in a weight ratio of from 10:90 to 99:1.

Reinforcing fibers are generally divided into organic and inorganic fibers. Of the organic fibers, pulp fibers are preferably used. Broadleaf wood pulp is often used as the pulp fiber, although other pulps such as conifer wood pulp, linter pulp, recycled paper pulp, and conventional pulp fibers of short fiber form may also be used. Polypropylene, vinylon and acrylic fibers are also useful. They may be used alone or in combination of two or more. Suitable inorganic fibers include sepiolite, wollastonite, and attapulgite, which may be used alone or in combination of two or more. A mixture of organic and inorganic fibers is also acceptable.

The reinforcing fibers are preferably used in an amount of 0.1 to 50 parts, more preferably 0.15 to 40 parts by weight per 100 parts by weight of the cement and gypsum. Outside the range, a less amount of reinforcing fibers may fail to provide the necessary strength whereas an excessive amount of reinforcing fibers may require a more amount of water which interferes with setting.

If necessary, setting accelerators and retarders, and surface active agents are used. Suitable setting accelerators include calcium chloride, lithium chloride and calcium formate; suitable setting retarders include sodium citrate and sodium gluconate; suitable surface active agents are water-reducing agents or dispersing agents such as polycarboxylic acids and melamine derivatives. These agents are effective for managing the physical properties of a fresh hydraulic composition immediately after mixing of components with water. Any agent meeting a particular purpose may be added in a conventional amount.

In the hydraulic composition, a thickener may be used. Suitable thickeners include semisynthetic water-soluble polymers such as modified starch; synthetic water-soluble polymers such as polyvinyl alcohol, polyacrylamide, polyethylene glycol, and polyethylene oxide; and fermented polysaccharides such as wellan gum. The hydroxyalkyl alkyl cellulose may be combined with another cellulose ether thickener. Any of these additives may be used as long as the objects of the invention are not impaired.

The hydraulic composition is prepared by uniformly mixing the essential and optional components, adding water thereto, and further mixing. Water is preferably used in amounts of 20 to 60 parts by weight provided that the total of the entire components in the hydraulic composition excluding water is 100 parts by weight. Outside the range, extrusion molding may be difficult with a less amount of water whereas a more amount of water may adversely affect extrusion molding and cause undercure.

The hydraulic composition is suited for extrusion molding. It is typically worked by a vacuum extrusion molding machine and molded into the desired shape through a die at its discharge outlet. The molded part is subjected to steam curing or moist air curing and further to high-pressure steam curing or firing for achieving the desired strength. The molded part finds use as sidings or panels for use in houses and low or medium-rise buildings.

EXAMPLE

Examples are provided to illustrate the invention, and are not intended to limit the scope thereof.

Examples 1-9 and Comparative Examples 1-3

Components

Extrusion molding compositions were prepared from the following materials.
(1) Cement: ordinary Portland cement (Taiheiyo Materials Corp.)
(2) Aggregate: powdered silica, 250 mesh sifted (Maruesu Co., Ltd.)
(3) Light aggregate: perlite N-3 (Hattori Co., Ltd.)
(4) Reinforcing fibers: broadleaf wood pulp fibers, average fiber length 1.5 mm
(5) Reinforcing fibers: polypropylene fibers, 13 dtex, fiber length 6 mm (Hagihara Industries Inc.)
(6) Water-soluble hydroxyalkyl alkyl cellulose: Table 1

Hydroxypropyl methyl cellulose (HPMC) and hydroxyethyl methyl cellulose (HEMC) have properties as shown in Table 1. Notably, DS is degree of alkyl substitution and MS is molar substitution of hydroxylalkyl.

TABLE 1

| Sample No. | Cellulose | DS | MS | DS + MS | Proportion of unsubstituted glucose (mol %) | Viscosity of 1 wt % aqueous solution (mPa·s) | Ash content (wt %) | Light transmittance (%) |
|---|---|---|---|---|---|---|---|---|
| 1 | HPMC | 1.7 | 0.25 | 1.95 | 3.9 | 19,400 | 0.73 | 75 |
| 2 | HPMC | 1.4 | 0.46 | 1.86 | 4.5 | 18,300 | 0.15 | 80 |
| 3 | HPMC | 1.2 | 0.30 | 1.50 | 9.8 | 23,400 | 0.10 | 93 |
| 4 | HEMC | 1.3 | 0.35 | 1.65 | 9.4 | 8,700 | 1.77 | 78 |
| 5 | HEMC | 1.5 | 0.28 | 1.78 | 8.5 | 15,300 | 1.52 | 83 |
| 6 | HPMC | 1.9 | 0.25 | 2.15 | 3.0 | 16,500 | 0.20 | 80 |
| 7 | HEMC | 1.1 | 0.20 | 1.30 | 18.2 | 14,000 | 1.34 | 85 |
| 8 | HPMC | 1.5 | 0.18 | 1.68 | 13.4 | 17,300 | 0.58 | 75 |

[Preparation]

A composition was prepared by premixing the above materials other than water in a mixer, adding the prescribed amount of water thereto, and kneading the mixture for 7 minutes in a kneader. It was evaluated for extrusion molding. The jacket temperature of the kneader/extrusion molding machine was set such that the molded part might be at 35° C. Extrusion moldability and cure time were evaluated by the following methods, with the results shown in Tables 2 and 3.

1. Extrusion Moldability

The composition was extruded through a die sized 6×75 mm. A molded part was visually observed to inspect cracks and meandering stream.

2. Cure Time

The composition was extruded through a die sized 20×40 mm. A molded part was cured in a thermo-hygrostat chamber at 65° C. and RH 100% and measured for flexural strength at intervals of 15 minutes. A time passed until a flexural strength of 2 N/mm$^2$, which ensures easy conveyance of the molded part, is reached is reported as "cure time."

TABLE 2

| Components | Example | | | | | | | | |
|---|---|---|---|---|---|---|---|---|---|
| (pbw) | 1 | 2 | 3 | 4 | 5 | 6 | 7 | 8 | 9 |
| Cement | 35.0 | 35.0 | 35.0 | 35.0 | 35.0 | 35.0 | 35.0 | 38.0 | 35.0 |
| Powdered silica | 44.0 | 44.0 | 44.0 | 44.0 | 44.0 | 44.0 | 44.0 | 41.0 | 41.0 |
| Perlite | 15.0 | 15.0 | 15.0 | 15.0 | 15.0 | 15.0 | 15.0 | 15.0 | 15.0 |
| Broadleaf wood pulp fibers | 5.0 | 5.0 | 5.0 | 5.0 | 5.0 | 5.0 | 5.0 | 5.0 | 6.5 |
| Polypropylene fibers | 1.0 | 1.0 | 1.0 | 1.0 | 1.0 | 1.0 | 1.0 | 1.0 | 2.5 |
| Water-soluble hydroxyalkyl alkyl cellulose | 1.0 No. 1 | 1.0 No. 2 | 1.0 No. 3 | 1.0 No. 4 | 1.0 No. 5 | 1.2 No. 1 | 1.0 No. 2 | 1.0 No. 3 | 1.0 No. 4 |
| Water | 50.0 | 50.0 | 50.0 | 50.0 | 50.0 | 50.0 | 52.0 | 50.0 | 50.0 |
| Results | | | | | | | | | |
| Extrusion moldability  Cracks | No | No | No | No | No | No | No | No | No |
| Extrusion moldability  Meander | No | No | No | No | No | No | No | No | No |
| Cure time (h) | 5.00 | 5.25 | 6.00 | 6.50 | 6.25 | 5.00 | 5.75 | 6.00 | 6.75 |

TABLE 3

| Components | Comparative Example | | |
|---|---|---|---|
| (pbw) | 1 | 2 | 3 |
| Cement | 35.0 | 35.0 | 35.0 |
| Powdered silica | 44.0 | 44.0 | 44.0 |
| Perlite | 15.0 | 15.0 | 15.0 |
| Broadleaf wood pulp fibers | 5.0 | 5.0 | 5.0 |
| Polypropylene fibers | 1.0 | 1.0 | 1.0 |
| Water-soluble hydroxyalkyl alkyl cellulose | 1.0 No.6 | 1.0 No.7 | 1.0 No.8 |
| Water | 50.0 | 50.0 | 50.0 |
| Results | | | |
| Extrusion moldability  Cracks | Found | Some | No |
| Extrusion moldability  Meander | Found | Some | No |
| Cure time (h) | — | 6.25 | 8.50 | 7.50 |

As is evident from Table 2, hydraulic compositions using water-soluble hydroxyalkyl alkyl cellulose having desired properties are effectively extrusion moldable and curable in a shortened cure time.

In contrast, Table 3 shows that Comparative Example 1 using water-soluble hydroxyalkyl alkyl cellulose whose DS and DS+MS are outside the range is defective in extrusion molding. Comparative Example 2 using water-soluble hydroxyalkyl alkyl cellulose whose DS, DS+MS and proportion of unsubstituted glucose are outside the range is defective in extrusion molding and needs a longer cure time. Comparative Example 3 using water-soluble hydroxyalkyl alkyl cellulose whose proportion of unsubstituted glucose exceeds 10 mol % needs a longer cure time.

Japanese Patent Application No. 2012-154270 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An extrusion molding hydraulic composition comprising a water-soluble hydroxyalkyl alkyl cellulose, cement, an aggregate, reinforcing fibers, and water, wherein
said hydroxyalkyl alkyl cellulose has a degree of alkyl substitution of 1.2 to 1.7, the sum of the degree of alkyl substitution and the molar substitution of hydroxyalkyl is 1.5 to 2.0, and a proportion of glucose ring not substituted with alkyl and hydroxyalkyl groups per glucose ring unit is up to 10 mol %.

2. The composition of claim 1 wherein said hydroxyalkyl alkyl cellulose is hydroxypropyl methyl cellulose or hydroxyethyl methyl cellulose.

3. The composition of claim 2 wherein said hydroxyalkyl alkyl cellulose has an ash content which is up to 1.0% by weight for hydroxypropyl methyl cellulose or up to 2.0% by weight for hydroxyethyl methyl cellulose.

4. The composition of any one of claims 1 to 3 wherein said hydroxyalkyl alkyl cellulose has a light transmittance of at least 75% when measured as a 2 wt % aqueous solution at 20° C., wavelength 720 nm, and cell length 20 mm.

* * * * *